United States Patent [19]

Royer et al.

[11] Patent Number: 5,083,752
[45] Date of Patent: Jan. 28, 1992

[54] ARRANGEMENT FOR FIXING FRICTION PATCHES ON A GATE VALVE SHUTTER DISC

[75] Inventors: Jean-Claude Royer, Lesmenils; Jean-Pierre Hanicot, Pont Saint Vincent, both of France

[73] Assignee: Pont-A-Mousson S.A., Nancy, France

[21] Appl. No.: 580,996

[22] Filed: Sep. 12, 1990

[30] Foreign Application Priority Data

Sep. 12, 1989 [FR] France .................. 89 12077

[51] Int. Cl.$^5$ ............................................. F16K 3/00
[52] U.S. Cl. ................... 251/356; 251/326; 251/327
[58] Field of Search ............... 251/305, 306, 356, 357, 251/326, 327

[56] References Cited

U.S. PATENT DOCUMENTS

| 3,399,863 | 9/1968 | Fawkes | 251/306 |
| 3,544,066 | 12/1970 | Fawkes | 251/306 |
| 3,861,646 | 1/1975 | Douglas | 152/357 |
| 4,531,532 | 7/1985 | Zimmerly | 251/357 |
| 4,682,759 | 7/1987 | Hall et al. | 251/356 |

FOREIGN PATENT DOCUMENTS

| 173673 | 10/1982 | Japan | 251/306 |
| 895163 | 5/1962 | United Kingdom | 251/306 |

Primary Examiner—A. Michael Chambers
Attorney, Agent, or Firm—Sughrue, Mion, Zinn, Macpeak and Seas

[57] ABSTRACT

Friction patches 7 are fixed on the metal core 1 of a shutter of a disc valve. The core comprises at least one seating 3 intended to accommodate a friction patch 7 provided with deformable fingers 8 which permit its accurate positioning on the core and its mechanical attachment on the disc via an injection elastomer 2.

7 Claims, 3 Drawing Sheets

ARRANGEMENT FOR FIXING FRICTION PATCHES ON A GATE VALVE SHUTTER DISC

BACKGROUND OF THE INVENTION

This invention relates to a shutter disc for a gate valve, and more specifically to a disc provided with plastic friction patches which make it possible to reduce the coefficient of friction between the disc and the valve body, and to its method of manufacture. Such discs are generally formed by a metal core, for example of cast iron, over which an elastomer is molded.

The coefficient of friction between the elastomers and the material constituting the body of the valve, generally cast iron covered with an epoxy resin, is relatively high, which means that after a certain number of open/close cycles of the valve substantial wear takes place on the elastomer at points whereat the guide surfaces of the disc contact the body of the valve, and there is a tearing of the material constituting the body of the valve. This has led to the appearance of friction patches or shoes adhesively bonded to the disc at the points whereat the guide surfaces contact the body of the valve. These patches are made from a plastic having a lower coefficient of friction than that of the elastomers of the material constituting the body of the valve.

Two techniques are used to fix the patches on the disc. The first comprises adhesively bonding the patches at the desired place on the metal core of the disc before covering the latter with elastomer, and the second comprises adhesively bonding the patches to the core after the elastomer has been molded on.

This method of fixing the patches, by adhesive bonding, is unsatisfactory because the discs undergo very high mechanical stresses which are incompatible with the adhesion of the bonds, the more so since they act in a liquid medium which may be hot or aggressive.

Another method of fixing the patches, without adhesive bonding, comprises using the elastomer as an intermediary between the patches and the core of the disc. In this case the patches possess, on their face turned towards the core of the disc, a plurality of cavities in swallow-tail shape which are to be filled with elastomer, thus creating a mechanical joint between the patches and the elastomer which is fixed to the core of the disc. The disadvantage of this method of fixing lies in the fact that, in order to produce a disc, it is necessary to place a core, and the patches, in the injection mold for the elastomer, leaving a free space between the patches and the core of the disc in order to allow the elastomer to pass. The elastomer is injected under a pressure in excess of 100 bars, however, which can cause the displacement of the patches in the mold, and which results in the presence of elastomer above the patches. In this case, the patches no longer fulfill their function, since friction will take place on the elastomer.

SUMMARY OF THE INVENTION

This invention relates to a device for fixing patches to a shutter disc of a gate valve, enabling these disadvantages to be overcome.

The invention relates more specifically to a device for fixing a friction patch on the metal core of a disc of a gate valve, the metal core of the disc comprising at least one seating intended to accommodate a friction patch, in which the friction patch is provided with deformable fingers permitting its accurate positioning on the core and its mechanical attachment on the disc.

Each seating is provided with at least one projecting stud, intended to position the patch and retain it in place, interacting with a hole provided on the inner face of the patch, facing the core of the disc.

DETAILED DESCRIPTION OF THE PREFERRED EMBODIMENTS

Figure 1:
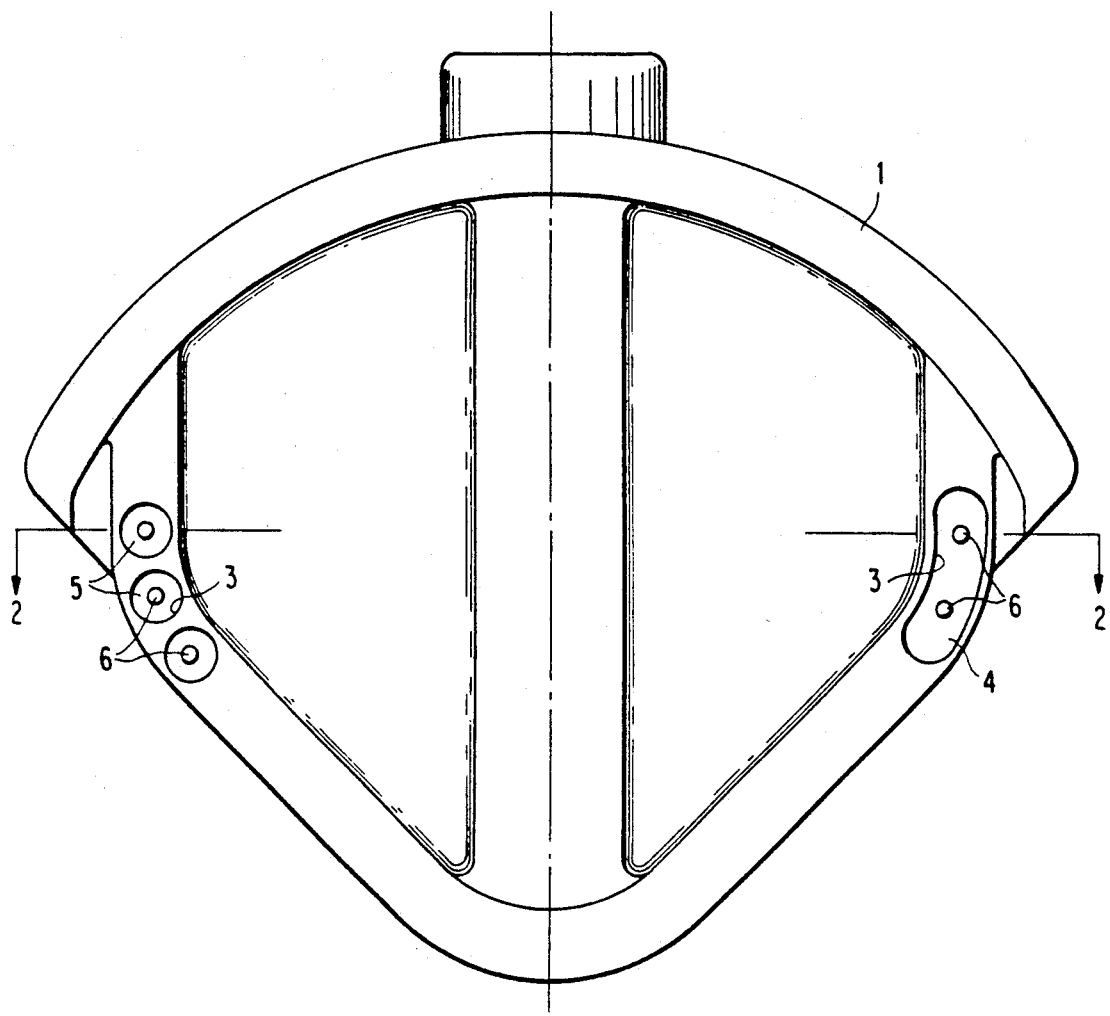
FIG. 1 is a plan view of the core of a shutter disc according to the invention.
Figure 2:
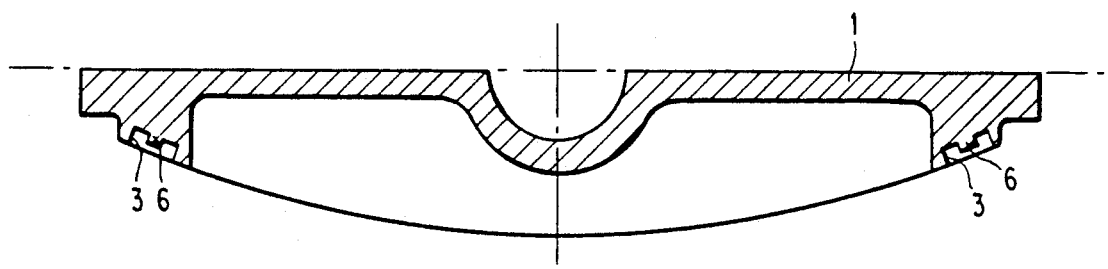
FIG. 2 is a cross-section along line 2—2 in FIG. 1.
Figure 3:
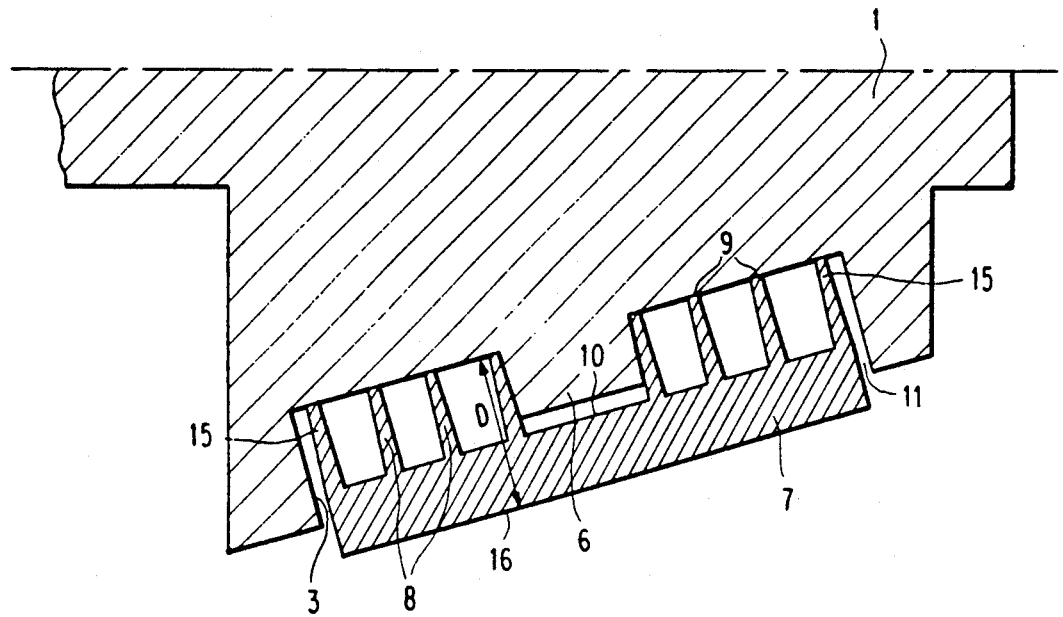
FIG. 3 is a detailed sectional view of the friction patches of the disc according to the invention before closure of the elastomer injection mold.

The shutter disc according to the invention is formed by a core 1, for example of cast iron, having a molded-on elastomer covering 2. The core is provided with at least one seating 3, provided at the level of the guide faces of the disc. In the embodiment shown in FIG. 1, the disc core has on one side a single seating 4 of elongate shape, and on the other side three seatings 5 of circular shape. Each seating 3 is provided with at least one projecting stud 6.

The seating 4 has two slightly conical studs 6 projecting upwardly from its bottom, and equally distributed in the seating, each having an axis perpendicular to the bottom of the seating, and each seating 5 has a centrally projecting stud 6 at its bottom.

Patches 7 are positioned and retained in place in the seatings 3 of the core 1 of the disc. The patches 7 are provided with deformable fingers 8 permitting the perfectly accurate positioning of the patches on the core of the disc and the mechanical attachment of the patches on the disc. Their inner face 9, facing the disc core, is provided with at least one hole 10, having an axis perpendicular to the face 9 and a diameter slightly less than that of the studs 6 of the seatings 3 of the core. The inner face 9 of the patches is provided with a plurality of fingers 8 which are perpendicular to the inner face 9, interacting with the bottom of the seatings 3, and with a cylindrical hole 10 having an axis perpendicular to the face.

The transverse and longitudinal dimensions of the patches 7 are less than those of the seatings 3 of the disc core, in order to preserve a free space 11 between the edge of the patches 7 and that of the seatings 3. In the case of cylindrical patches, the diameter of the patches is less than the diameter of the seatings 3.

The total height D of the patches is greater than the distance d equal to the depth of the seatings 3 plus the thickness of the elastomer which is to be molded on, or more simply, equal to the height between the bottom of the seatings 3 and the inner wall of the elastomer injection mold when the latter is closed on the core 1 of the disc.

Figure 6:
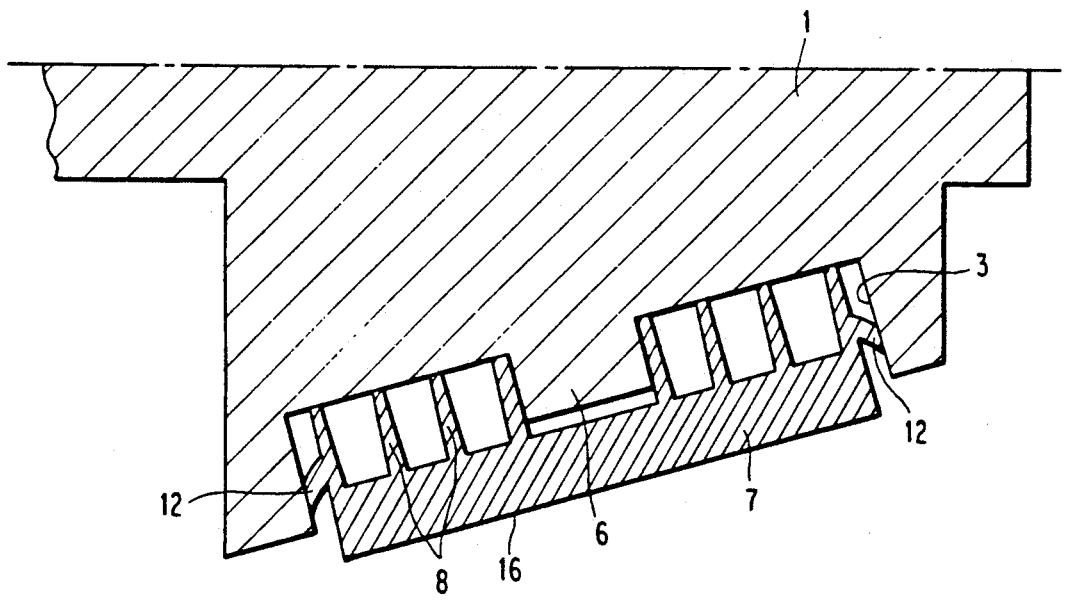
FIG. 6 is a sectional view of an alternative embodiment of the patches of the disc according to the invention.

In the alternative embodiment shown in FIG. 6, the patches are provided with fingers 12 which project laterally, interacting with the lateral faces of the seatings 3.

The method of manufacture of the disc is as follows. The core 1 provided with the seatings 3, which are obtained directly during casting, that is to say without machining, is blasted and cleaned. The patches 7 are then positioned in the seatings. The dimension of the holes 10 being slightly less than that of the studs 6 on the one hand, combined with the conicity of the studs 6 on the other hand, makes it possible to retain the patches 7 in place in the seatings 3. In the event that patches such as those shown in FIG. 6 are being used, the lateral fingers 12 make it possible to perfect the positioning and the retention in place of the patches.

Figure 4:
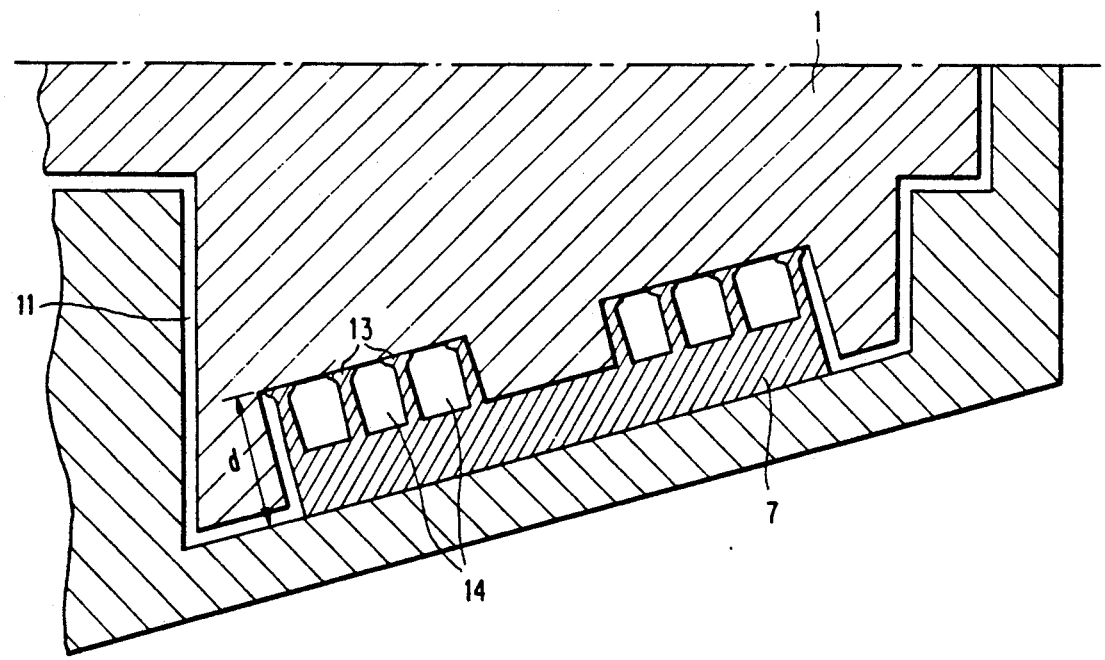
FIG. 4 is a sectional view of the patches of the disc according to the invention after closure of the elastomer injection mold.
Figure 5:
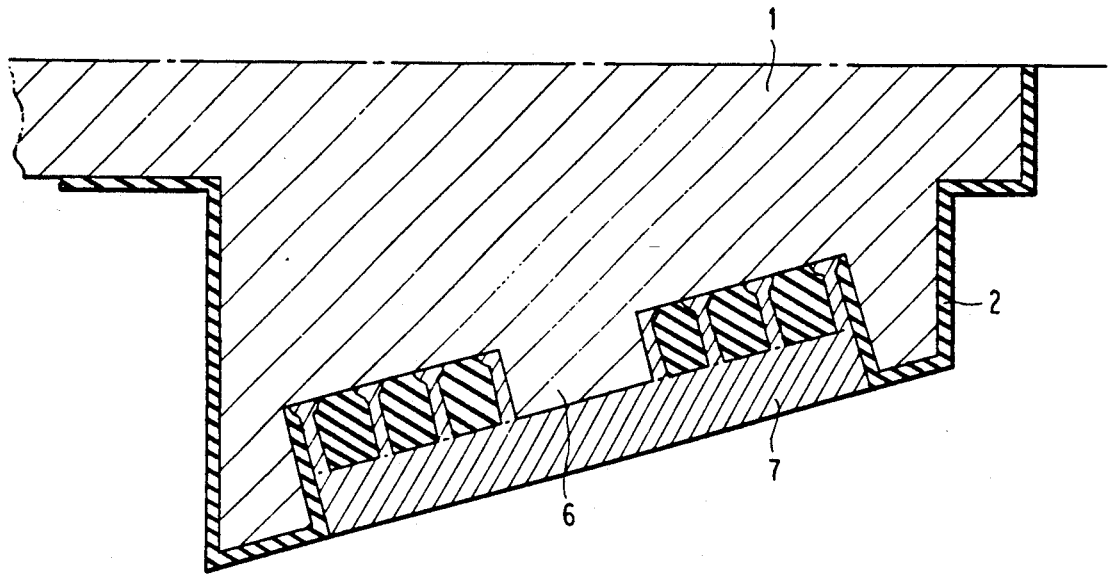
FIG. 5 is a detailed view, in section, of the disc according to the invention.

The assembly of core 1 and patches 7 is then placed in an elastomer injection mold (FIG. 4). When the mold is closed, given that the height D of the patches is greater than the distance d between the bottom of the seatings 3 and the inner wall of the mold, the patches are crushed in the seatings. The free ends 15 of the fingers 8 in contact with the bottom of the seatings 3 are deformed into enlargements or heads 13, thus causing the appearance of cavities 14. Thus, during this operation, the outer face 16 of the patches 7, in contact with the mold, accurately adopts the shape thereof, and the differences in thickness of the core of the disc, due to casting tolerances, are compensated.

The elastomer is then injected into the mold. The latter penetrates into the cavities 14 via the free space 11, and the mechanical attachment of the patches onto the disc is thus achieved via the elastomer. If necessary, the patches 7 are provided with ducts (not shown) :or the evacuation of air during the phase of injecting the elastomer.

An alternative embodiment (not shown) comprises providing at least one hole in the bottom of the seatings 3 of the disc core, and at least one projecting stud on the inner face of the patches 7, of a shape which mates with that of the holes in the seatings 3.

The advantages of such a disc are as follows:

the core of the disc requires no special machining;

the friction patches are attached to the disc mechanically and not by adhesive bonding;

any differences in the thickness of the core of the disc caused by casting tolerances are compensated;

the elastomer cannot cover the friction patches; and the patches are retained in place mechanically on the core of the disc with no risk of being displaced during the injection of the elastomer.

We claim:

1. An arrangement for fixing a discrete friction path (7) on a core (1) of a gate valve shutter disc, comprising:
  (a) a discrete recessed seating (3) defined in a surface of the core at a site whereat the shutter disc contacts a valve body with which said disc cooperates, said seating being configured to accommodate the patch,
  (b) a plurality of deformable fingers (8) upstanding from an inner face of the patch, extending into the seating, abutting a bottom of the seating, and individually defining enlarged heads (13) in engagement with said bottom, and
  (c) mechanical anchoring means (2) filling a remainder of the seating, unoccupied by the patch and fingers, for retaining the patch on the core.

2. An arrangement as set forth in claim 1, wherein the anchoring means comprises an injection molded elastomer.

3. An arrangement as set forth in claim 1, further comprising a positioning stud (6) upstanding from one of the seating and the patch, and a blind bore (10) defined in another of the seating and the patch for receiving the stud.

4. An arrangement as set forth in claim 3, wherein the stud is conical, has an axis perpendicular to the seating bottom, and upstands from a center of the seating, dimensions of the blind bore are slightly less than corresponding dimensions of the stud, and the blind bore is forcibly fitted over the stud.

5. An arrangement as set forth in claim 2, wherein a height D of the patch is greater than a distance d between the seating bottom and an inner face of an elastomer injection mold when the mold is closed on the core.

6. An arrangement as set forth in claim 1, further comprising lateral fingers (12) outstanding from the patch, in engagement with lateral faces of the seating.

7. An arrangement as set forth in claim 1, further comprising air evacuation ducts defined in the patch.

* * * * *